United States Patent [19]

Bertram et al.

[11] Patent Number: 4,792,493
[45] Date of Patent: Dec. 20, 1988

[54] CORROSION RESISTANT COATING AND LINER COMBINATION

[76] Inventors: Richard L. Bertram, 8577 Wonderland Ave., Hollywood, Calif. 90046; Vernie L. Belcher, 1851 Redondela Dr., Rancho Palos Verdes, Calif. 90732

[21] Appl. No.: 916,172

[22] Filed: Oct. 7, 1986

[51] Int. Cl.⁴ .............................................. B32B 27/00
[52] U.S. Cl. .................................. 428/424.8; 428/911
[58] Field of Search ............................. 428/424.8, 911

[56] References Cited

U.S. PATENT DOCUMENTS

| | | | |
|---|---|---|---|
| 4,112,176 | 9/1978 | Bailey | 428/424.8 |
| 4,296,156 | 10/1981 | Lustig et al. | 428/424.6 |
| 4,307,000 | 12/1981 | Vasta | 428/424.7 |

FOREIGN PATENT DOCUMENTS

| | | | |
|---|---|---|---|
| 1591995 | 6/1970 | France | 428/424.2 |
| 103955 | 8/1980 | Japan | 428/424.2 |

*Primary Examiner*—Edith Buffalow
*Attorney, Agent, or Firm*—Thomas A. Turner, Jr.; Seymour A. Scholnick

[57] ABSTRACT

A layer of polyethylene or polyvinal chloride bonded to a layer of polyurethane material in turn bonded to a surface of material such as concrete or metal comprises a combination of a coating and a liner which prevents corrosion of the coated, lined material and is substantially free of pin hole penetrations. A method of spray applying atomized polyurethane material to a surface to be coated, such as concrete or metal, and thereover applying a layer of polyethylene or polyvinal chloride material is described. A machine for spray applying polyurethane material from a nozzle atomizes the polyurethane material at elevated pressures and temperatures.

7 Claims, 2 Drawing Sheets

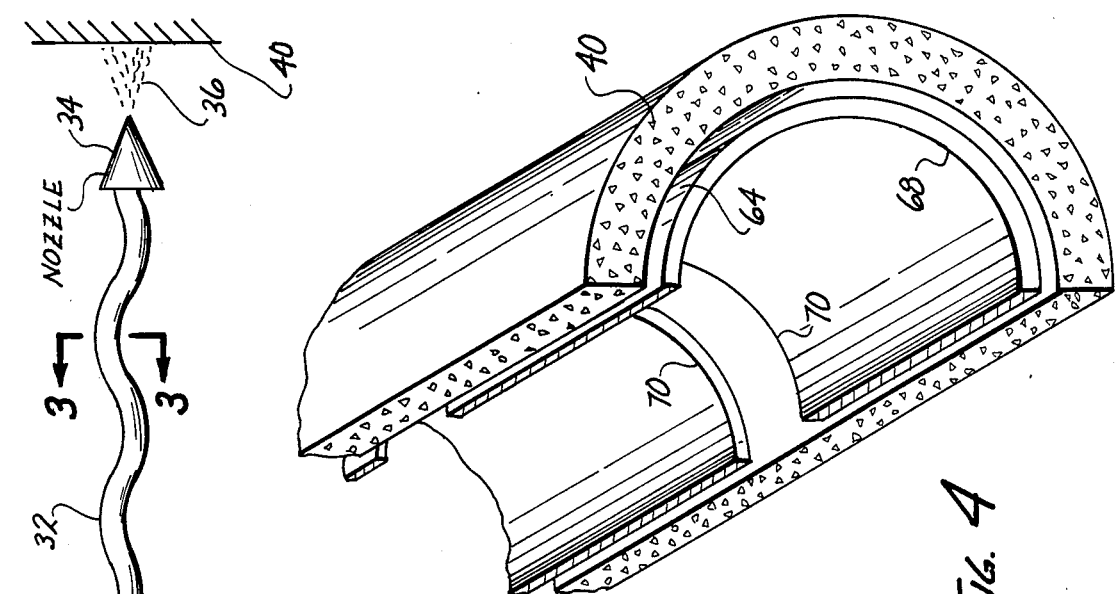
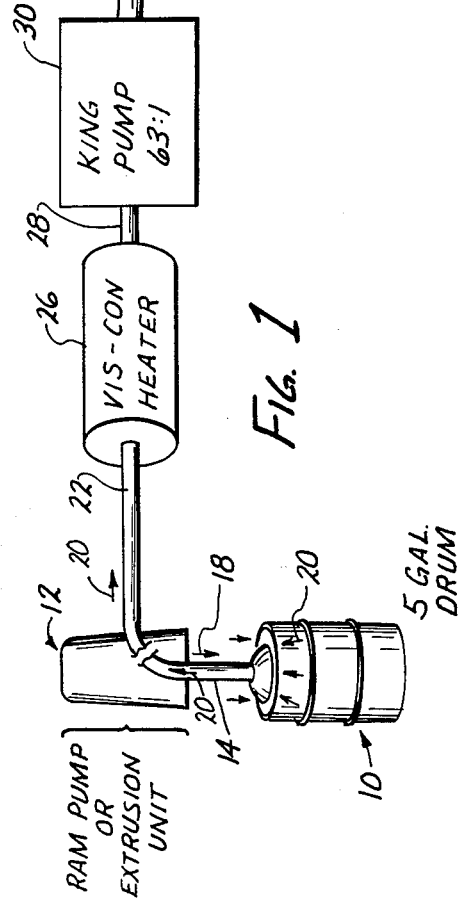
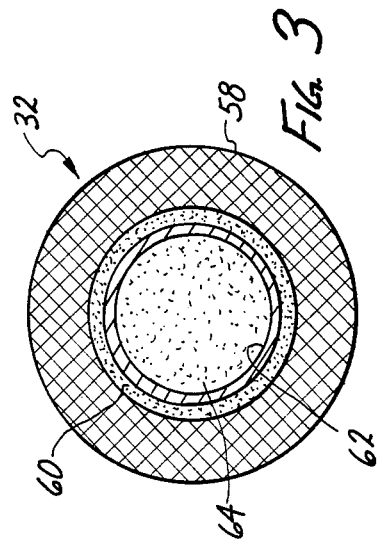

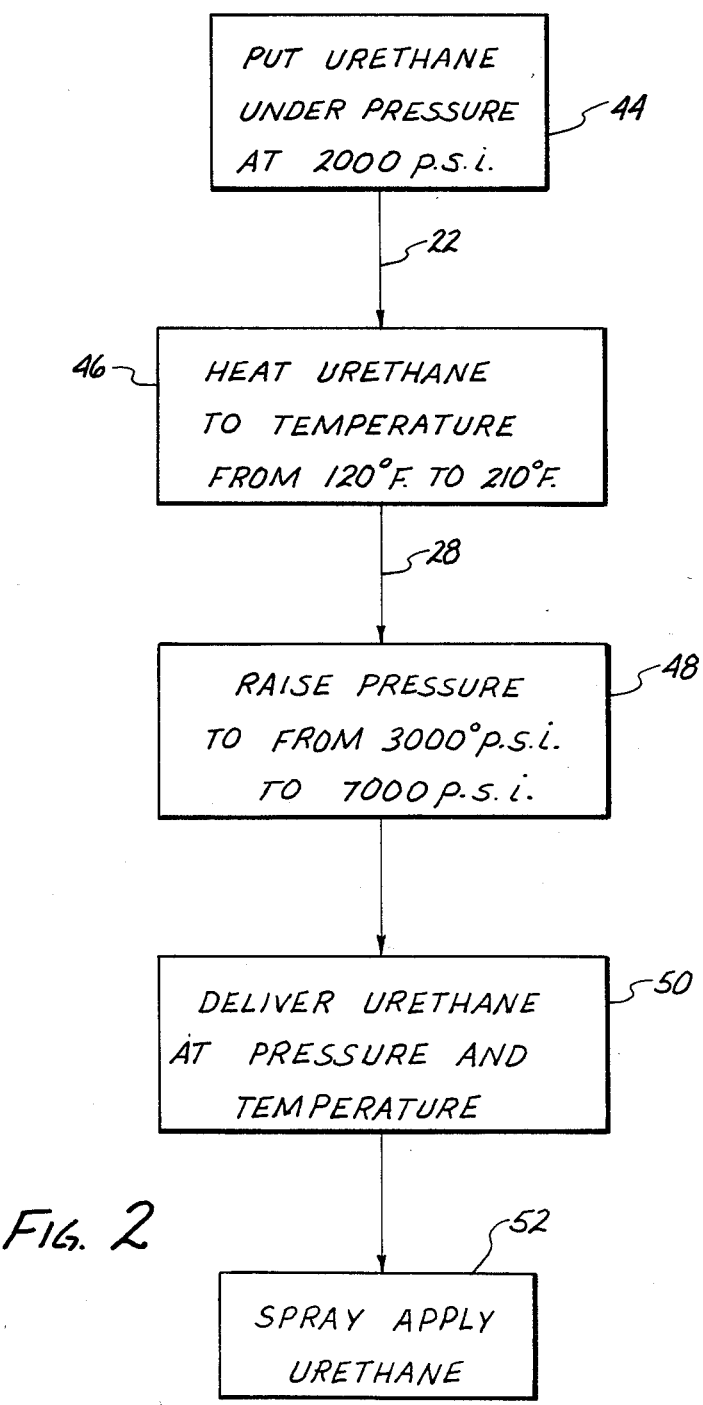

CORROSION RESISTANT COATING AND LINER COMBINATION

BACKGROUND OF THE INVENTION

1. Field of Invention

The present invention relates to the art of coating concrete or metal surfaces to resist corrosion, and more particularly to the application of polymer layers to surfaces to prevent pin holes and other corrosion enhancing conditions against corrosive liquids and materials.

2. Description of the Prior Art

In the past it has been known to coat the inner surfaces of water or sewer pipes and reservoirs in order to retard the disintegration of the pipe and reservoir walls. Such pipes and reservoirs frequently are made of concrete, but often can be made with metal liners and metal parts. Fluid flowing through such pipes and into such reservoirs contain highly corrosive material, both caustic and acidic which ultimately has a deteriorating effect on the pipes and reservoir walls.

It has been suggested before to use coatings and liners for protecting such pipes and walls. Such coatings and liners frequently were made of various forms of plastic and epoxy materials. When such epoxy materials were applied to water system pipes and reservoirs, small pin holes or "blow holes," as they are frequently called, remain in the coating upon settling or curing. Over a period of time, the caustic in the fluid will seep through such pin holes or blow holes and slowly corrode the concrete or metal which is supposed to be protected.

On the other hand, polyethylene strips and similar type plastic strips have been applied to the surfaces of such pipes and reservoirs. Such strips were fastened to the surfaces by various mechanical lockings, such as, for example, "T" locks, bolts, screws and like fastening arrangements. While such locking arrangements operate to keep the polyethylene or other type of plastic strips in proximity to the pipe or reservoir wall surface, the corrosive fluids oftentimes seeped through the cracks created by the locking arrangements themselves to corrode the wall substrate and migrate laterally from the fastening seam or hole to further deteriorate, eventually, the entire substrate. In addition, the bolt and screw fastening arrangements actually protrude into the wall substrate to cause further deterioration or weakening.

It is known that polyethylene strips are good lining material for containing acidic fluids. In transporting such corrosive fluids, bladder-type liners insertable into the transportion means, such as, for example, containment holding tanks, have been used. Such liners, however, require structural support. In some instances, extremely thick plastic liners must be employed. Such plastic liners, however, have never been adhered to the wall or pipe throughout the surface area of coverage by a self sufficient protective coating.

Moreover, any pin hole or other break or penetration through the liner will normally contaminate and corrode the entire substrate.

It has long been sought to provide a method for bonding a polyethylene or a polyvinyl chloride material coating to the entire surface area of a pipe or reservoir so as to provide a complete coating and liner barrier which is free of pin holes or blow holes, and without the conventional method of mechanically fastening or locking such polyethylene sheets onto the surface. It has also long been sought to fasten a polyethylene or polyvinal chloride lining to an entire substrate by means of a bonding agent which itself provides additional protection to the substrate, such as polyurethane.

SUMMARY OF THE INVENTION

In brief, in accordance with one aspect of the invention, a method of applying a coating to a surface of a water system pipe or reservoir is described as first spray applying a urethane material to a wall or substrate. In the spray application urethane material is atomized by first a combination of heating and pressure, and passing the material through a nozzle at such pressures and heat. The urethane material is maintained at elevated temperatures by the special hose apparatus having heating elements throughout the length of the hose.

Sheets of polyethylene material are first prepared by having the surface of the polyethylene material roughened. The polyethylene material is then layered onto the polyurethane material layer which was spray applied. The polyethylene material is overlaid on its longitudinal edges with adjacent polyethylene layer strips.

The method produces a coating-lining material for pipes and walls highly susceptible to corrosive deterioration which coating-lining material comprises a polyurethane material layer, which is applied to the pipe or wall bonded to a polyethylene layer. The coating-lining is highly resistant to acidic corrosive deterioration and is free of pin holes or blow holes. Further, the coating-lining is not mechanically interlocked into the walls or substrate so as to provide cracks for seepage of corrosive fluids which deteriorate the the wall or pipe substrate.

An apparatus for spray applying the polyurethane material in atomized form comprises a series of pumps for stepping up the pressure first to approximately 2,000 psi, and then to 4,000 and more psi in accordance with the combination of pressure and temperature needed for a particular application. In the interim between the two pressure steps, the polyurethane material is heated to at least approximately 120° F., and up to 210° F., again in accordance with a combination of pressure and temperature necessary to achieve the atomized particle sizes. The apparatus could include a hose having temperature sensing elements at periodic points along the longitudinal length of the hose, and heating elements applying heat in response to the temperature sensing elements, to maintain the polyurethane throughout the hose at the minimum elevated temperatures. The hose is completed by a nozzle which atomizes the polyurethane in the direction of the nozzle.

Other novel features which are believed to be characteristic of the invention, both as to organization and method of operation, together with further object and advantages thereof, will be better understood from the following detailed description considered in connection with the accompany drawings in which a preferred embodiment of the invention is illustrated by way of example. It is to be understood, however, that the drawings are for the purpose of illustration and description only, and are not intended as a definition of limits of the invention.

BRIEF DESCRIPTIONS OF THE DRAWINGS

FIG. 1 is a diagramatic schematic of an apparatus for spray applying the polyurethane in accordance with one aspect of the invention;

FIG. 2 is a schematic block diagram of the method of applying polyurethane in accordance with one aspect of the invention;

FIG. 3 is a cross sectional view taken along lines 3—3 of FIG. 1; and

FIG. 4 is a partially cut-away, perspective view of the preferred embodiment of the coating and liner combination of the present invention.

DESCRIPTION OF THE PREFERRED EMBODIMENT

Polyurethane sealant is normally delivered in five-gallon drums 10 in a highly viscous, almost solid state, reference being had initially to FIG. 1 of the accompanying drawings. A ram pump or extrusion unit 12 is used to force the urethane into a flow by moving a pump 14 having a follower plate 16 attached at its bottom. The pump 14 is moved in the direction of arrows 18 in a downward direction, forcing the urethane in the upward direction of arrows 20 through the inner conduit 22.

The pressure in the conduit 22 is approximately 2000 pounds per square inch (p.s.i.) initially. The conduit 22 directs the urethane to a heater 26 which raises the temperature to the working temperature for the apparatus. The higher the temperature, the less pressure that will be necessary at the spray application nozzle, as will be explained in greater detail below.

The urethane at the elevated temperature is directed through conduit 28 to pump 30 having an incoming-air-pressure-to-outgoing-fluid pressure of 63:1. Pump 30 raises the pressure of the urethane in the outgoing conduit 32 to that predetermined pressure complemental to the temperature in order to accomplish the desired flow characteristics desired. Normally, pressures in the range of from 4000 p.s.i. tp 5000 p.s.i. have been used, but conditions may warrant pressures as low as 3000 p.s.i, with substantially high temeratures, up to 7000 p.s.i. or more in very low temperature situations.

The conduit 32 comprises a hose 32, which will be explained in greater detail below, culminating in a nozzle 34. The urethane is forced through the nozzle 34 at the elevated temperature and high pressure through an orifice of approximately 0.031 inch to atomize the urethane 36 in relatively small particles. By directing the nozzle 34, the urethane can be spray applied onto a wall 40 or similar type surface of a substrate such as concrete, metal and the like, to any thickness desired. Normally, a thickness of 125 mils is desirable, although thicknesses of from 40 mils to 500 mils have been used with satisfactory results.

A method used for applying the polyurethane material 36 includes an initial step of putting the urethane material under substantial pressure 44 in order to get the urethane flowing, reference being had to FIG. 2 of the drawings. Once flowing, the urethane material can be directed, as through conduit 22 to heaters capable of heating 46 the urethane to the desired temperature. It is desirable to be able to raise the temperature to from 120 to 210 degrees Fahrenheit.

The urethane material is then delivered through conduit 28 to a pump, in the present embodiment having an incoming-air- to- outgoing-fluid pressure ratio of 63:1. The pressure of the urethane material is then raised 48 to from 3000 p.s.i. to whatever pressure may be desired, in some instances as much as 7000 p.s.i. or even higher. The pressure is determined by the temperature which can be successfully achieved, the pressure being higher for lower temperatures achieved. In actual uses, a temperature of from 190 degrees to 200 degrees Fahrenheit at a pressure of approximately 5000 p.s.i. has been found very satisfactory.

The urethane material is then spray applied 52 onto the surface of the wall or the substrate to be coated. The polyurethane material may be pure polyurethane, but in the preferred embodiment comprises substantially polyurethane having approximately six (6) per cent aromatic solvents mixed therein. Solvents which have been used with satisfactory results include methylbenzene, toluene, xylene, methylethylketone and combinations thereof.

In FIG. 3, the hose 32 comprises an outer shell 58 of insulating material. Within the insulating material of the outer shell 58, a heating element comprising a copper wire 60 is coiled helically. When electrical energy is applied to and through the wire 60, heat is discharged to the wall 62 of the hose 32 through which the urethane 64 is flowing.

Once the urethane 64 is applied onto the wall 40 to form a layer, as may be schematically seen in FIG. 4, and before the polyurethane 64 sets or cures, sheets or layers of polyethylene 68 or polyvinyl chloride are applied onto the urethane base. Polyethylene 68 normally comes in sheets or layers having two surfaces on opposite sides, bounded by common longitudinal edges 70. A surface of the polyethylene layer 68 which is to be applied directly to the polyurethane layer is first treated or prepared in order to adhere or bond to the urethane.

A treatment or preparation that will be suitable is the roughening of the surface with the gas flame of propane or methylacetylene propane. The surface may also be roughened by a discharge of electrical energy through the polyethylene layer in the corona spectrum. If the polyethylene layers are to be overlapped at the longitudinal edges so as to form a lap seam, both sides must be treated. In the normal application, the corona discharge roughening step will effectively roughen both sides of the polyethylene layers at the same time.

Polyvinyl chloride should be prepared for bonding with the urethane by applying a clear moisture-cured polyurethane primer-activator containing aromatic solvents.

The polyethylene or polyvinyl chloride layers are applied to the polyurethane base while wetting ability is at an optimum and before the polyurethane base cures or sets, normally a time period of approximately three (3) hours after spray applying the urethane.

Polyethylene and polyvinyl chloride have the advantage of being substantially free of pin holes and "blow holes." The polyethylenes and polyvinyl chlorides, also, are capable of being sealed at their adjoining edges by merely overlapping the longitudinal edges approximately four (4) inches where both sides of the layers of the plastic are roughened or otherwise treated in order to accomplish adhesion.

While several aspects of the preferred embodiment of our invention have been described in detail, it will be understood by those skilled in the art that several additional embodiments of the invention can be perceived. It is to be understood that the described embodiments, together with these additional embodiments are intended to be covered by the present teachings, and that the scope of the invention is to be defined by the appended claims.

We claim:

1. A coating for material susceptible to corrosive deteriorization by contact with elements, comprising:
   a. a layer of polyurethane material bonded to an exposed surface of said material susceptible to corrosive deteriorization; and
   b. a polyethylene layer bonded to said layer of polyurethane and substantially separate from said material.

2. The coating of claim 1 wherein said polyurethane material includes at least polyurethane and an aromatic solvent.

3. The coating of claim 2 wherein said polyurethane material comprises approximately six (6) percent aromatic solvent.

4. The coating of claim 2 wherein said aromatic solvent comprises a solvent selected from the group consisting of methylbenzene, toluene, methylethylketone, xylene and combinations thereof.

5. The coating of claim 1 wherein said material susceptible to corrosive deteriorization is concrete, and said polyurethane material is approximately 125 mils thick, and wherein said polyethylene is approximatelY 10 mils thick.

6. The coating of claim 1 wherein said polyethylene layer has at least one surface roughened before being bonded to said layer of polyurethane.

7. A coating for material susceptible to corrosive deteriorization by contact with elements, comprising:
   a. a layer of polyurethane material bonded to an exposed surface of said material susceptible to corrosive deteriorization; and
   b. a polyvinylchloride layer bonded to said layer of polyurethane and substantially separated from said material.

* * * * *